June 16, 1936.　　A. K. BRUMBAUGH　　2,044,055
MOTOR VEHICLE CONTROL
Filed Nov. 5, 1930　　2 Sheets-Sheet 1
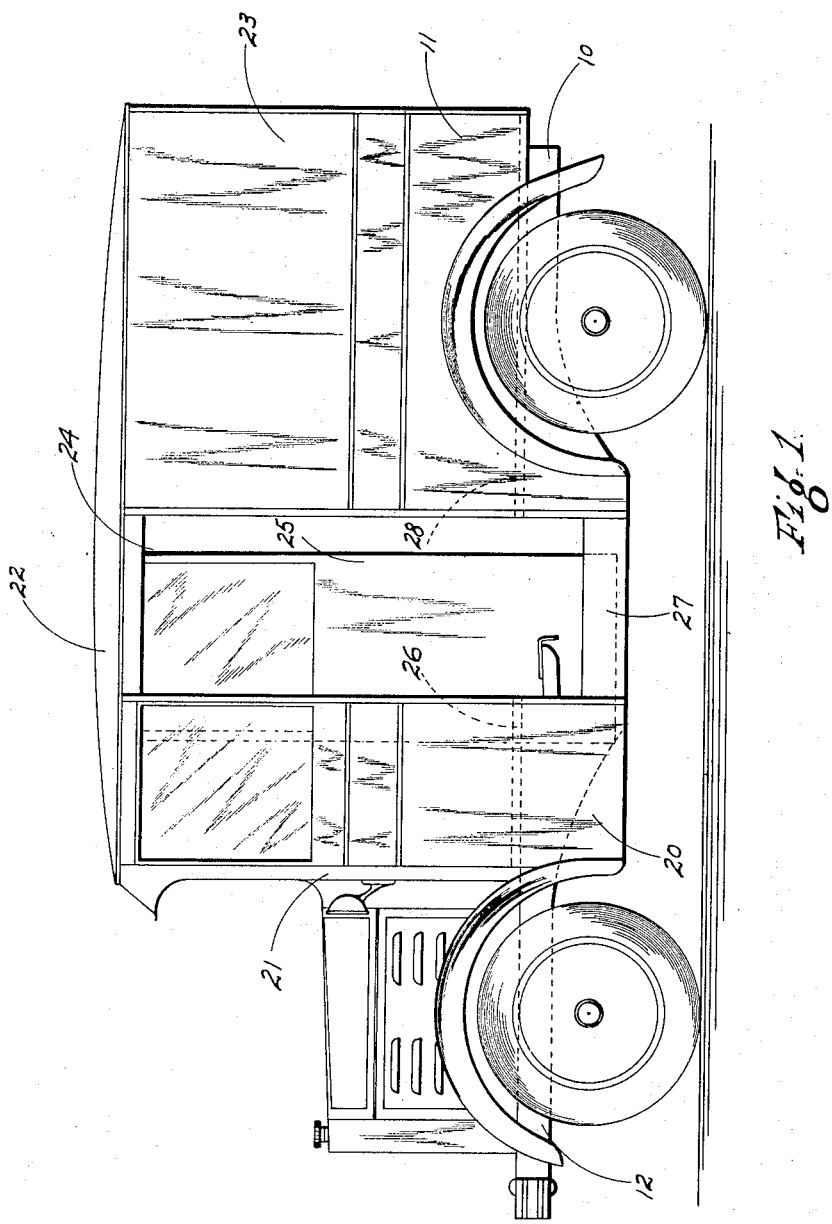
Inventor
ANDREW K. BRUMBAUGH
By Richey & Watts
Attorneys

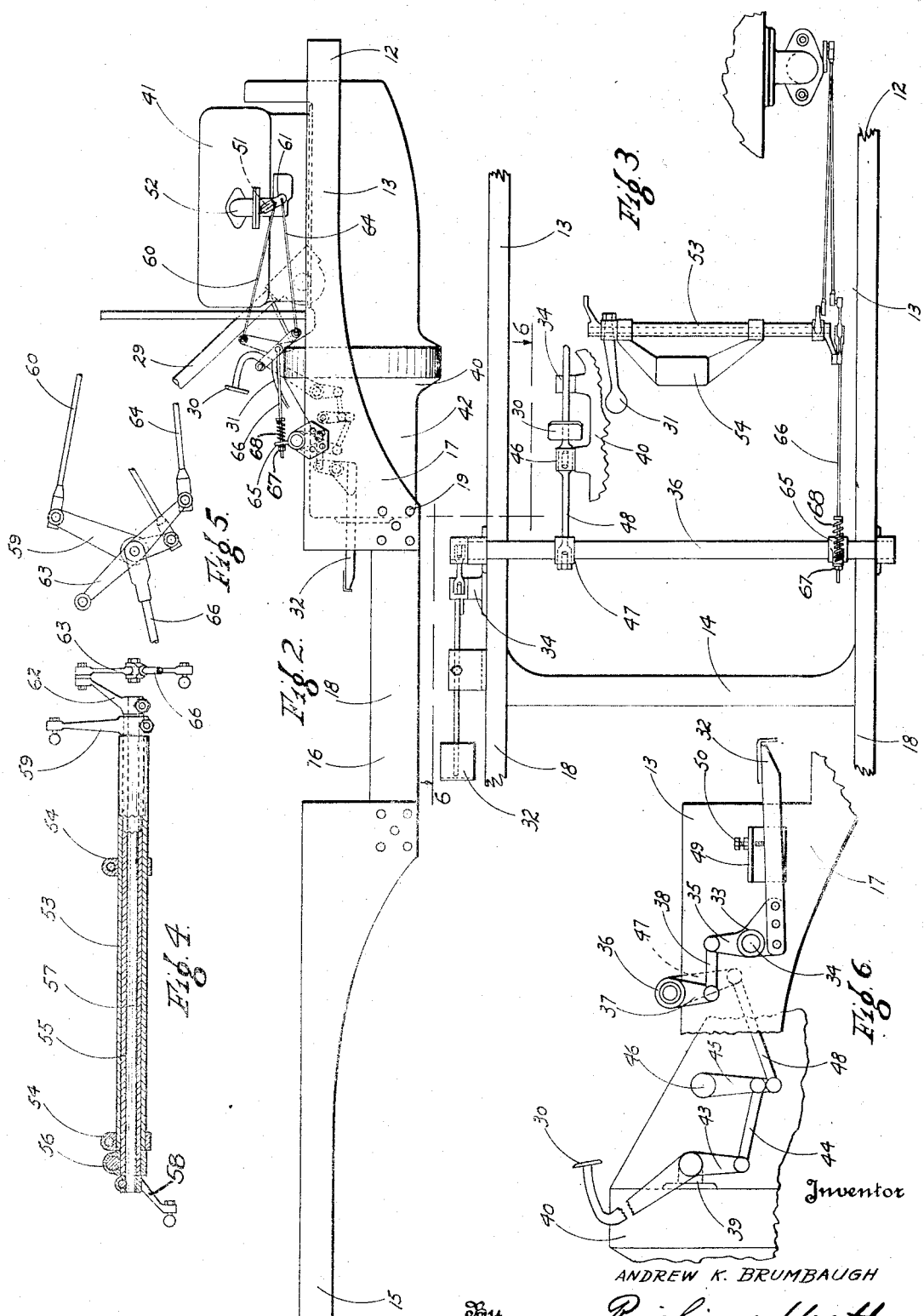

Patented June 16, 1936

2,044,055

UNITED STATES PATENT OFFICE 2,044,055

MOTOR VEHICLE CONTROL

Andrew K. Brumbaugh, Cleveland, Ohio, assignor to The White Motor Company, Cleveland, Ohio, a corporation of Ohio Application November 5, 1930, Serial No. 493,588

8 Claims. (Cl. 192—.01)

This invention relates to vehicles and particularly to motor vehicles such as delivery trucks and control mechanism therefor.

In the use of motor vehicles in making deliveries of milk or packages of any nature requiring a relatively large number of stops and a relatively small amount of driving between stops, it is found that the usual type of vehicle can be operated efficiently only if two or more men are employed, one to drive the vehicle and another to make deliveries.

The principal object of this invention is to provide a delivery truck or the like having the usual controls to permit the operator to drive the same in a seated position and having a compartment relatively close to the ground level in which the operator can stand to drive the vehicle for short distances between stops. Another object is to provide means accessible to the operator when standing to control the vehicle.

In driving an internal combustion engine motor vehicle having the conventional controls, it is necessary to partially close the throttle when disengaging the clutch for the purpose of shifting gears and to open the throttle and engage the clutch simultaneously after the gears have been shifted. Another object of this invention is to provide a control pedal accessible to an operator in standing position for actuating the clutch and to provide means operable by such pedal to automatically control the throttle to facilitate gear shifting. Another object of this invention is to provide an improved linkage for moving the throttle valve in the usual manner by a hand lever and a foot lever and for closing the throttle a pre-determined amount from the position at which it has been set by the hand lever upon disengagement of the clutch.

Other objects relating to details of construction and economies of manufacture will appear hereinafter.

In the accompanying drawings, which illustrate a preferred embodiment of the invention:

Fig. 1 is a side elevation of the improved vehicle.

Fig. 2 is a side elevation of the vehicle frame showing diagrammatically a portion of the engine and transmission and illustrating the arrangement of the improved control mechanism.

Fig. 3 is a plan view of the control mechanism showings portions of the vehicle frame.

Fig. 4 is a view partially in section and partially in elevation of the throttle control shafts.

Fig. 5 is an end view of the shafts shown in Fig. 4.

Fig. 6 is a fragmentary side elevation showing the auxiliary control pedal.

Referring to the drawings, the vehicle illustrated includes a sectional frame 10 and a body 11 mounted thereon. The frame 10 consists of a forward section 12 comprising a pair of side rails 13 connected together and spaced by any desired number of cross members 14, a similar rearward section 15, and an intermediate section 16. The side rails 13 are flared at their rearward ends to form relatively deep portions 17 to which the side rails 18 of the intermediate section 16 are secured, as by rivets 19, with their upper edges a substantial distance below the upper edges of the side rails 13. The side rails of the rearward section are similarly flared for attachment to the opposite ends of the rails 18.

The body 11 includes side panels 20 extending rearwardly from the dash 21 to the ends of the side rails 13 and extending vertically from the level of the lower edges of the side rails 18 to the roof 22 of the body. Side panels 23 extend rearwardly from the forward end of the section 15 to the rearward end of the body, providing door openings 24 on each side of the vehicle between the adjacent ends of the panels 20 and 23. Doors 25 may if desired, be slidably associated with the panels 20 and arranged to move to concealed positions within and parallel to the panels 20 or to positions closing the door openings 24.

A floor 26 is arranged immediately above the side rails 13 and conterminous with the side panels 20. A floor section 27 is supported at the level of the side rails 18, and a third floor section 28 is mounted above the frame section 15 in the plane of the floor 26. This construction provides a relatively deep space between the floor section 27 and the roof 22 within which the operator of the vehicle may comfortably stand upright. The floor section 27 is relatively close to the ground level so that the operator may easily step onto the same from the ground.

The usual vehicle controls, including a steering column 29, a clutch pedal 30, a throttle pedal 31, and a service brake, a hand brake, and a gear shift lever (not shown) project into the compartment defined by the dash 21, the panels 20, and the floor 26. All of these controls are arranged in the conventional manner so as to be conveniently accessible to an operator seated upon a removable or folding seat of any convenient type carried by the vehicle (not shown); and the steering column, the hand brake, and the gear shift lever are arranged to be conveniently accessible to the operator when standing upon the floor section 27.

An auxiliary control pedal 32 is carried by the side rail 13 adjacent the standards controls and is preferably mounted outside the side rail and within the panel 20 and in a position accessible to the operator when standing upon the floor section 27. The inner end of the pedal 32 is provided with an opening 33 receiving a pivot pin 34 mounted on the frame side rail 13, and a bell crank extension 35. A shaft 36 extends across the vehicle and is pivotally supported at its ends by brackets attached to the opposed side rails 13. An arm 37 is secured to the shaft 36 and is connected to the extension 35 by means of a link 38, whereby pivotal movement of the pedal 32 oscillates the shaft 36.

The clutch pedal 30 is pivoted in the usual manner to a boss 39 on the flywheel housing 40 which is assembled as a unit with the engine 41 and transmission casing 42. The pedal 30 carries an integral extension 43 connected by a link 44 to an arm 45 which is rigidly secured to a shaft 46 journalled in the housing 40. A clutch (not shown) is arranged to be released by rotation of the shaft 46 when the pedal 30 is depressed. A spring normally maintains the clutch engaged and the pedal 30 extended.

An arm 47 is rigidly secured to the shaft 36 and is connected to the arm 45 by a link 48. The clutch spring therefore normally maintains the pedal 32 raised, and the clutch may be released against the tension of the spring by depressing either the pedal 30 or the auxiliary pedal 32. A bracket 49 is preferably secured to the frame side rail 17 and carries a set screw 50 to engage the upper edge of the pedal 32 and limit the upward movement thereof.

The speed of the engine 41 is controlled by a throttle valve 51 mounted in the usual manner in the intake conduit 52 of the engine. For the purpose of controlling the throttle valve, the vehicle is provided with a throttle pedal 31 and a hand throttle lever mounted upon the steering column 29. A sleeve 53 is secured to the flywheel housing 40 by means of a bracket 54 and extends transversely of the vehicle. A hollow shaft 55 is rotatably mounted within the sleeve 53 and carries a bracket 56 at one end receiving the throttle pedal 31 so that depression of said pedal rotates the shaft 55. A solid shaft 57 is telescoped within the hollow shaft 55 and is mounted for independent rotation. An arm 58 secured to the shaft 57 is operably connected to the hand throttle control so that adjustment of such control rotates the shaft 57.

The opposite end of the hollow shaft 55 is provided with an arm 59 which is connected by a link 60 to an arm 61 secured to the throttle valve 51. The shaft 57 terminates in an arm 62 pivoted to one end of a lever 63, the opposite end of which is pivoted to a link 64 which is also connected to the arm 61 of the throttle valve.

A bracket 65 projects upwardly from the shaft 36 and is apertured to receive a rod 66 pivoted to the mid-point of the lever 63. The rod 66 is provided with an enlarged stop 67 to abut the bracket 65 and also with a spring 68 to normally maintain the rod 66 extended with the stop 67 in contact with the bracket 65.

The hand throttle control lever is mounted with sufficient friction to retain any set position of adjustment, while the pedal 31 is freely mounted. Movement of the hand throttle lever causes rotation of the shaft 57 and corresponding oscillation of the arm 62. When the arm 62 is caused to move in a clockwise direction, as seen in Figs. 2 and 5, the lever 63 must rotate about its pivotal connection with either the rod 66 or the link 64. Since the rod 66 is held against forward movement by contact of the stop 67 with the bracket 65, the lever 63 rotates about its center and draws the link 64 rearwardly to open the throttle. When the hand throttle control is moved in the opposite direction the rod 66 is maintained against rearward movement by the spring 68 in the absence of a force acting on the pedal 31, and the throttle is closed. During such opening or closing movement of the hand control lever the pedal 31 moves to corresponding positions by reason of its connection to the arm 61 by the link 60, arm 59, and shaft 55.

When the pedal 31 is depressed independently of the hand control lever, the throttle is moved directly in a clockwise direction through the aforementioned connection. During this movement the lever 63 rotates about its connection with the arm 62 and the rod 66 is moved rearwardly through the bracket 59 against the tension of the spring 68. When the pedal 31 is released the motion is reversed and the spring 68 moves the throttle to closed position and raises the pedal 31.

It will be evident that when the auxiliary control pedal 32 is depressed to disengage the clutch the bracket 65 will be moved forwardly, causing the spring 68 to act on the rod 66 to tend to move the throttle toward closed position. If the hand throttle control has been set at closed or fully retarded position the throttle will be unaffected and the spring 68 will merely be compressed. If, however, the hand throttle lever has been set in an opened or partially opened position, the movement of the bracket 65 incident to the operation of the auxiliary control pedal will move the throttle toward closed position, the movement of the throttle from the set position being proportional to the movement of the pedal 32.

In the operation of the vehicle, the operator may drive the same to the point at which deliveries are to commence in a seated position using the standard vehicle controls. While making deliveries, the operator may stand upon the floor 27 and steer the vehicle in the usual manner, while controlling the speed by the hand throttle lever and the conventional hand brake. When it is desired to shift gears, the auxiliary control pedal 32 is depressed, releasing the clutch and retarding the engine. The gears may then be readily shifted and the pedal 32 released slowly, causing a smooth engagement of the clutch and a gradual increase in the throttle valve opening to take the load. During this operation the operator may retain one hand upon the steering wheel and the other upon the gear shift lever without touching the hand throttle control. If it were attempted to shift the gears in this manner without controlling the throttle, the engine would race when the clutch were released, hindering the meshing of the gears, and if the engine had been previously retarded, the application of the load upon re-engagement of the clutch would tend to stall the engine.

In the operation of a vehicle in the usual manner the throttle valve is regulated in this way by means of the foot throttle pedal. Since the auxiliary control is connected to the standard clutch pedal, the operator is relieved of this duty when the vehicle is operated with the standard controls.

While one embodiment of the invention has been described in detail in order that the same may be fully disclosed, it is to be understood that the invention is not limited to any specific form and that modifications and re-arrangements of parts may be resorted to without departing from the spirit and scope of the following claims.

I claim:

1. In a motor vehicle, a motor having a throttle valve and a clutch, a link connected to said throttle valve for operating the same, said link being pivoted to a lever, a fulcrum for said lever, manually controlled means for rocking said lever on said fulcrum to actuate said throttle valve, and means for operating said clutch arranged to move said fulcrum and link without moving said manually controlled means.

2. In a motor vehicle, a motor having a throttle valve and a clutch, a link connected to said throttle valve for operating the same, said link being pivoted to a lever, manually movable means pivoted to said lever, a rod pivoted to said lever and serving as a fulcrum, means for operating said clutch including a movable member associated with said rod, and a spring between said member and said rod whereby movement of said member exerts a force on said lever tending to move said throttle valve.

3. In a motor vehicle, a motor having a throttle valve, a pair of links connected to said throttle valve for operating the same, manually movable means connected to one of said links, the other link being pivoted to a lever, a second manually movable means connected to said lever, and a third manually movable means resiliently connected to said lever, each of said second and third manually movable means operable as a fulcrum for the other to enable actuation of said throttle valve.

4. In a motor vehicle, a motor having a throttle valve and a clutch, a pair of links pivoted to said throttle valve for operating the same, manually movable means connected to one of said links, the other of said links being pivoted to a lever, a second manually movable means connected to said lever, a pedal for operating said clutch, an auxiliary pedal for operating said clutch, and a resilient connection between said auxiliary pedal and said lever permitting independent operation of said manually movable means and operable to exert a force on said lever tending to move said throttle valve upon actuation of said auxiliary pedal.

5. In a motor vehicle, a motor having a throttle valve and a clutch, a pair of links pivoted to said throttle valve, a pair of rock shafts, one of said shafts carrying a throttle pedal and having an arm pivoted to one of said links, the other of said shafts having an arm pivoted to a lever connected to the other of said links and being operably connected to a manually movable control arm, a pedal for actuating said clutch including an apertured member movable therewith, a rod pivoted to said lever and slidable in the aperture in said member, a stop for preventing relative movement of said rod and member in one direction, and a spring for normally maintaining said stop in contact with said member.

6. In a motor vehicle, the combination of a motor having a throttle valve, control means for said throttle valve arranged to be set in adjusted position, said means including a lever and a positively positioned fulcrum about which the lever pivots to open the throttle valve, a clutch, a pedal for operating said clutch, a second pedal for operating said clutch from a different position, and means actuated by either of said pedals for moving the fulcrum of the lever control means to exert a closing force on said throttle valve when said clutch is disengaged.

7. In a motor vehicle, a motor having a throttle valve and a clutch, a pair of links pivoted to said throttle valve for operating the same, manually movable means connected to one of said links, the other of said links being pivoted to a lever, a second manually movable means connected to said lever, a pedal for operating said clutch, and a member connected to said lever and serving as a fulcrum for said lever, said member being resiliently connected to said pedal and permitting independent operation of said manually movable means and operable to exert a force on said lever tending to move said throttle valve upon actuation of said clutch.

8. A dual controlled vehicle including a motor having throttle valve and a clutch, a laterally positioned shaft journalled on the vehicle, a plurality of clutch control means connected to the shaft and adapted to rock the same upon movement of the clutch to and from engagement, a jack shaft journalled on the vehicle in a lateral position between the motor and the first named shaft, means on the jack shaft controlling the position of the throttle valve and means connecting the first-named shaft and the jack shaft to permit independent throttle adjustment on the jack shaft while insuring that movement of the clutch to disengaged position will close the throttle with automatic opening upon clutch re-engagement.

A. K. BRUMBAUGH.